United States Patent [19]
Pachter et al.

[11] 3,879,555
[45] Apr. 22, 1975

[54] METHOD OF TREATING DRUG ADDICTS

[75] Inventors: Irwin J. Pachter, Fayetteville; Maxwell Gordon, Dewitt, both of N.Y.

[73] Assignee: Bristol-Myers Company, New York, N.Y.

[22] Filed: Aug. 16, 1973

[21] Appl. No.: 388,858

Related U.S. Application Data

[63] Continuation of Ser. No. 90,058, Nov. 16, 1970, abandoned, which is a continuation-in-part of Ser. No. 60,621, Aug. 3, 1970, Pat. No. 3,773,955.

[52] U.S. Cl. ................................ 424/260; 424/10
[51] Int. Cl. ............................................ A61r 27/00
[58] Field of Search .............................. 424/10, 260

[56] References Cited
UNITED STATES PATENTS
3,332,950  7/1967  Blumberg et al. ................. 424/260

FOREIGN PATENTS OR APPLICATIONS
751,767  7/1956  United Kingdom................ 424/260
769,517  3/1957  United Kingdom................ 424/260
791,644  3/1958  United Kingdom................ 424/10
808,269  1/1959  United Kingdom................ 424/10

OTHER PUBLICATIONS
Goodman et al., Pharmacological Basis of Therapeutics, 3rd Edition, 1965, pp. 274–279.

*Primary Examiner*—Albert T. Meyers
*Assistant Examiner*—Norman A. Drezin
*Attorney, Agent, or Firm*—James Magee, Jr.

[57] ABSTRACT

A new and novel orally effective, analgetic composition has been found which, upon parenteral administration, does not produce analgesia, euphoria or physical dependence, said composition comprising an orally inactive dose of 1-N-cyclopropylmethyl-7,8-dihydro-14-hydroxynormorphinone (I) and an orally active, strong analgetic in oral dosage form and containing for each analgetic dose of the analgetic agent an amount of compound I sufficient, upon parenteral administration of said oral dosage form, to negate the analgetic, euphoretic and dependence producing action of the composition.

Two preferred compositions would be: (1) 0.5 mg. of compound I and 2.5 mg. of phenazocine; (2) 0.5 mg. of compound I and 5 mg. of methadone.

2 Claims, No Drawings

METHOD OF TREATING DRUG ADDICTS

This is a continuation of application Ser. No. 90,058, filed Nov. 16, 1970, now abandoned, which is a continuation-in-part of application Ser. No. 60,621, filed Aug. 3, 1970, now U.S. Pat. No. 3,773,955.

BACKGROUND OF THE INVENTION

1. Field of the Invention

This invention is in the field of combinations of drugs for medicinal purposes, in particular, analgetic compositions for the treatment of pain.

2. Description of the Prior Art

A. 1-N-Cyclopropylmethyl-7,8-dihydro-14-hydroxynormorphinone (I) having the formula

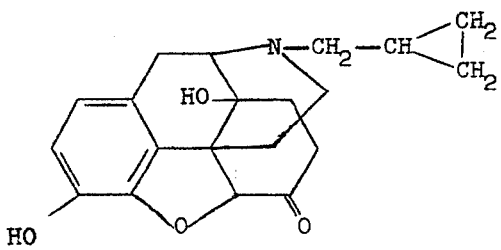

is described in U.S. Pat. No. 3,332,950, issued July 25, 1967.

B. H. BLumberg, H. B. Dayton, and P. S. Wolf, Toxicology and Applied Pharmacology, 10, (1967) disclose compound I as having limited effectivenss as an analgesic but potent narcotic antagonistic activity, about 39 times more potent than nalorphine.

C. U.S. Pat. No. 3,254,088 which issued May 31, 1966, describes the preparation of naloxone and its activity as a narcotic antagonist.

D. U.S. Pat. No. 3,493,657 which issued Feb. 3, 1970, describes the combination of morphine and naloxone as a composition for parenteral use "which has a strong analgetic, as well as antagonistic effect, without the occurrence of undesired or dangerous side effects."

E. A New York Times article appearing in a July 14, 1970 issue describes the oral administration of naloxone to narcotic addicts as a method of treatment. The oral administration of naloxone (in high doses) "makes it impossible for the addict to experience a high no matter how much heroin he uses."

F. The publication of the Committee on Problems of Drug Dependence, Addendum 1, p. 2 (1970) reports the compound UM 792 (EN 1639, Compound I) "to precipitate Abstinence in nonwithdrawn monkeys. It is about 6 to 13 times more potent than nalorphine. It has a long duration of action, comparable to that of cyclazocine."

Applicants are of the opinion that the prior art neither teaches nor suggests the compositions of the instant invention, said compositions being orally active analgetic agents producing neither analgesia, euphoria or physical dependence upon parenteral administration.

Drug abuse has almost become a way of life to a rapidly growing segment of the world population, especially here in the United States. It has become the vogue of many of the young generation to experiment with any type of drug that will produce an emotional, psychological, euphoric, depressive or generally psychodelic experience.

Those drugs most commonly employed for such illicit purposes include the barbiturates, lysergic acid diethylamide (LSD), mescaline, marijuana (tetrahydrocannabinol), strong analgetics (heroin, codeine, morphine, meperidine, cocaine, propoxyphene [Darvon], methadone, dihydrocodeinone, pentazocine, and the like), the central nervous system stimulants (the amphetamines and the like) and some of the major and minor tranquilizers (the promazines, meprobamate, the diazepines, and the like). Most of these compounds are commonly used in medicine for the legitimate treatment of various conditions and therefore have a limited availability in our society. While these agents are a necessary part of modern medicine, it would be highly desirable (1) to produce new drugs that do not possess drug abuse potential or (2) to "denature" the old agents to prevent their illicit use. The pharamceutical industry has been striving to achieve the first goal for many years but most regrettably has only achieved very moderate success. If one focuses on the strong analgetics, it becomes apparent that much effort and money has been expended to produce chemicals possessing good analgetic activity but little or no addictive liability. While good progress has been made as evidenced, for example, by the development of propoxyphene as a replacement for morphine or meperidine, it is unfortunate that these compounds are still reported in the medical literature to be addictive and/or euphoric and subjected to abuse by parenteral administration. Furthermore, some of these agents have undesirable side effects, i.e., bad hallucinations, etc.

It is commonly known to the narcotic enforcement agencies and others in the medical trades that a substantially large amount of the strong analgetics destined for legitimate medicinal use become diverted by dishonest or careless handling. In most instances these compounds are obtained by the addict or potential addict by theft or casual prescribing practice by the physician.

It is known from experience that the true narcotic addict must feed his habit by the parenteral route (mainlining) to obtain the maximum euphoric effect. The potential addict or thrill-seeker will also experiment in the same manner. Unfortunately, a substantial amount of the legitimate strong analgetics formulated in oral dosage form are diverted to parenteral use and abuse. Since the oral dosage forms of these drugs diverted from legitimate channels must be parenterally usable to produce the desired euphoria, it follows that if these oral dosage forms are in some way rendered inactive or unpleasant for parenteral use the addict or potential addict will be cut off from this particular supply of euphoretic drugs.

1-N-Cyclopropylmethyl-7,8-dihydro-14-hydroxynormorphinone (compound I, EN-1639) is described in the literature as being a potent morphine (narcotic) antagonist about 39 times as potent as nalorphine upon parenteral administration. As such, the product is useful for the treatment of narcotic overdosage or for the detection of addiction. However, while compound I is extremely potent parenterally (a parenteral dose of 0.05 to 1.25 mg. will produce narcotic withdrawal symptoms in the addict or have a narcotic reversal effect in an overdose situation), the compound must be administered in quantities much greater than the parenteral dose to obtain the same effect orally. The contemporaneous parenteral administration of equivalent therapeutic doses of compound I and a euphoretic narcotic or narcotic-like analgetic will negate the analgetic and euphoretic effect of the analgetic in the normal individual and the euphoric and/or maintenance effect of the analgetic in the addict.

Many interchangeable terms are commonly used to describe the psychic or physical dependence of people upon drugs. The term addiction is most commonly used when talking about the strong analgetics. The strong analgetics, in contrast to the weaker agents such as aspirin, acetaminophen, and the like, are employed in the relief of more severe pain. They usually produce a euphoric effect on parenteral administration.

Addiction can develop to the barbiturates and strong analgetic agents, in the sense of the term "addiction" as defined by the Committee on Problems of Drug Dependence of The National Research Council, formerly known as the Drug Addiction Committee of The National Research Council, namely, a state of periodic or chronic intoxication, detrimental to the individual and to society, produced by the repeated administration of a drug, its characteristics are a compulsion to take the drug and to increase the dose, with the development of psychic and sometimes physical dependence on the effects of the drug, so that the development of means to continue the administration of the drug becomes an important motive in the addicts existence.

Addiction to the strong narcotic or narcotic-like analgetics often occurs by the legitimate chronic parenteral administration of these agents in the alleviation of deep pain. More commonly, however, addiction to these agents occurs when the psychologically unbalanced or thrill-seeking individual looking for an escape from the realities of life finds his escape in the euphoria produced by the parenteral administration of strong analgetics. Euphoria is generally defined as a feeling of well-being. Euphoria can be produced in many ways, e.g., an exhilarating experience, alcohol, stimulants, depressants, narcotics, etc. For the purpose of this disclosure, "euphoria" is defined as an abnormal state of well-being produced by the parenteral administration of strong analgetic agents. The terms "euphoretic analgetics" and "strong analgetics," often called narcotic or narcotic-like analgetics, are also defined herein as including those chemical agents which upon parenteral administration are capable of maintaining or partially maintaining a known addict to heroin or the like without substantial withdrawal symptoms. For the purpose of this disclosure, a "strong analgetic" is also defined herein as any analgetic agent whose analgetic, euphoric or dependence producing actions are negated by the parenteral administration of compound I or a salt thereof.

SUMMARY OF THE INVENTION

It was an object of this invention to develop a potent, orally effective, but parenterally inactive analgetic composition that would have essentially no drug abuse potential. The object of the invention was achieved by the formulation of a composition comprising an orally inactive dose of compound I and an orally active strong, i.e., narcotic or narcotic-like, analgetic agent in oral dosage form which, when administered parenterally, had no drug abuse potential.

It is our invention to combine a parenterally effective but orally ineffective dose of compound I with an oral analgetic dose of an orally effective strong analgetic without interfering with the analgetic effect of the analgetic upon oral administration. At the same time, however, if any of the oral dosage form should be diverted into the hands of the addict or potential addict, the composition when injected parenterally would not produce any euphoria and in an addict would, in fact, actually cause some withdrawal symptoms.

Examples of some representative orally active strong analgetics and their preferred oral dosage ranges are: meperidine (50–250 mg.), oxymorphone (5–25 mg.), alphaprodine (50–250 mg.), anileridine (25–150 mg.), dextromoramide (5–25 mg.), dextropropoxyphene (32–150 mg.), methadone (5–25 mg.), metopon (3–15 mg.), levorphanol (2–10 mg.), phenazocine (2–10 mg.), ethoheptazine (100–500 mg.), propiram (50–500 mg.), profadol (20–250 mg.), phenampromide (50–250 mg.), thiambutene (20–150 mg.), pentazocine (20–200 mg.), pholcodeine (25–250 mg.), codeine (15–150 mg.), oxycodone (5–50 mg.), dihydrocodeinone (5–100 mg.), hydromorphone (10–100 mg.), fentanyl (0.5–10 mg.), 3′-trans-dimethylamino-4-phenyl-4-trans-carbethoxy-$\Delta'$-cyclohexene (50–250 mg.), 3-dimethylamino-0-(4-methoxyphenylcarbamoyl)-propiophenone oxime (25–150 mg.), (−)$\beta$-2′-hydroxy-2,9-dimethyl-5-phenyl-6,7-benzomorphan (10–150 mg.), (−)2′-hydroxy-2-(3-methyl-2-butenyl)-9-methyl-5-phenyl-6,7-benzomorphan (20–300 mg.), pirinitramide (10–150 mg.), (−)$\alpha$-5,9-diethyl-2′-hydroxy-2-methyl-6,7-benzomorphan (50–250 mg.), ethyl 1-(2-dimethylaminoethyl)-4,5,6,7-tetrahydro-3-methyl-4-oxo-6-phenylindole-2-carboxylate (50–150 mg.), 1-benzoylmethyl-2,3-dimethyl-3-(m-hydroxyphenyl)-piperidine (50–500 mg.), N-allyl-7$\alpha$-(1-(R)-hydroxy-1-methylbutyl)-6,14-endo-ethenotetrahydronororipavine (50–250 mg.), (−)2′-hydroxy-2-methyl-6,7-benzomorphan (50–250 mg.), noracylmethadol (10–150 mg.), $\alpha$-dl-methadol (5–25 mg.), $\beta$-dl-methadol (35–250 mg.), $\alpha$-l-methadol (2–15 mg.), $\beta$-dl-acetylmethadol (1–10 mg.), $\alpha$-l-acetylmethadol (1–10 mg.) and $\beta$-l-acetylmethadol (2–25 mg.).

When the term 1-N-cyclopropylmethyl-7,8-dihydro-14-hydroxynormorphinone (compound I) or the name of a strong analgetic agent is used herein, it is to be understood that any and all the pharmaceutically acceptable nontoxic salts thereof are also an integral part of this invention. The salts of these agents would include amongst others, the hydrochlorides, sulfates, bisulfates, tartrates, nitrates, citrates, bitartrates, phosphates, malates, maleates, hydrobromides, hydroiodides, fumarates, succinates, and the like.

The compositions of the present invention can be formulated into any of the known pharmaceutical forms for oral administration. As such the term "oral dosage form" includes solid compositions for oral administration in unit dosage form such as tablets, capsules, granules, powders, cachets or the like. Bulk powders of fixed composition for subdivision into therapeutic quantities, solutions, emulsions or suspensions of the composition are also included in the definition.

The compositions of the instant invention can also contain other active ingredients. These include amongst others for example, aspirin, phenacetin, caffeine, acetaminophen, antihistamines homatropine methylbromide, phenyltoloxamine citrate, barbituates, or the like, or multiple combinations thereof. Also included within the scope of the present invention are those compositions comprising compound I in combination with those antitussive preparations which contain narcotic or narcotic-like cough suppressants such as codeine, dihydrocodeinone, pholcodeine, and the like. Other products comprising a narcotic or narcotic-like composition for use as an antispasmotic in the gastro-intestinal tract, such as Camphorated Opium Tincture, U.S.P., Opium Tincture, U.S.P., Opium Extract, N.F., and the like can also be denatured with compound I and are considered an integral part of this invention.

One especially valued composition of the present invention is the orally active combination of methadone and compound I. This is particularly so because of the recently acknowledged and accepted method of treating narcotic addicts with methadone. The regimen of treatment involves the oral dosing of the addict one or more times a day with a maintenance dose of methadone adequate to prevent narcotic craving. One major disadvantage of the program is the necessity of the addict to report to a treatment center one or more times a day to receive his methadone. The oral methadone must be administered in the presence of a health officer to prevent its diversion into illicit channels where it can be abused parenterally so as to obtain a euphoric effect. However, this would not be so if the composition of the instant invention were to be employed. As explained above, the compound I-methadone composition would be orally active but could not be diverted to parenteral use because of the presence of the narcotic antagonist, compound I. It would therefore be possible to supply an addict with several days supply of his maintenance dose of methadone without fear of the composition being used for other than that intended.

A preferred embodiment of the present invention is an orally effective, analgetic composition which, upon parenteral administration, does not produce analgesia, euphoria or physical dependence, said composition comprising an orally ineffective but parenterally effective dose of compound I and an orally active, strong analgetic in oral dosage form.

A preferred embodiment of the present invention is an orally effective, analgetic composition which, upon parenteral administration does not produce analgesia, euphoria or physical dependence, said composition comprising an orally ineffective but parenterally effective dose of compound I and an analgetic dose of an orally active, strong analgetic in oral dosage form.

Another preferred embodiment is an orally effective, analgetic composition which, upon parenteral administration does not produce analgesia, euphoria or physical dependence, said compoiition comprising compound I and an orally active, strong analgetic in oral dosage form and containing for each analgetic dose of the analgetic agent an amount of compound I sufficient upon parenteral administration of said oral dosage form to negate the analgetic and euphoric action of the composition.

A more preferred embodiment is an orally effective, analgetic composition which, upon parenteral administration, does not produce analgesia, euphoria or physical dependence, said composition comprising compound I and an analgetic selected from the group consisting of meperidine, oxymorphone, alphaprodine, anileridine, dextromoramide, dextropropoxyphene, methadone, metopon, levorphanol, phenazocine, ethoheptazine, propiram, profadol, phenampromide, thiambutene, pentazocine, pholcodeine, codeine, oxycodone, dihydrocodeinone, hydromorphone, fentanyl, 3-trans-dimethylamino-4-phenyl-4-trans-carbethoxyΔ'-cyclohexene, 3-dimethylamino-0-(4-methoxyphenylcarbamoyl)-propiophenone oxime, (−)β-2'-hydroxy-2-(3-methyl-2-butenyl)-9methyl-5-phenyl-6,7-benzomorphan, piriinitramide, (−)-α-5,9-diethyl-2'-hydroxy-2-methyl-6,7-benzomorphan, ethyl 1-(2-dimethylaminoethyl)-4,5,6,7-tetrahydro-3-methyl-4-oxo-6-phenylindole -2-carboxylate, 1-Benzoylmethyl-2,3-dimethyl-3-(m-hydroxyphenyl)-piperidine, N-allyl-7α-(1-(R)-hydroxy-1-methylbutyl)-6,14-endo-ethanotetrahydronororipavine, (−)2'-hydroxy-2-methyl-6,7-benzomorphan, noracylmethadol, phenoperidine, α-dl-methadol, β-dl-methadol, β-1-methadol, β-dl-acetylmethadol, β-1-acetylmethadol and β-1-acetylmethadol, in oral dosage form and containing for each analgetic dose of the analgetic dose of the analgetic agent an amount of compound I sufficient upon parenteral administration of said dosage form to negate the analgetic and euphoric action of the composition.

A still further preferred embodiment is an orally effective, analgetic composition which, upon parenteral administration, does not produce analgesia, euphoria or physical dependence, said composition comprising by weight one part of compound I per 80 to 800 parts of meperidine, 0.8 to 8 parts of oxymorphone, 26 to 260 parts of alphaprodine, 24 to 240 parts of anileridine, 4 to 40 parts of dextromoramide, 24 to 240 parts of dextropropoxyphene, 5 to 50 parts of methadone, 0.6 to 6 parts of metopon, 1.6 to 16 parts of levorphanol, 1.6 to 16 parts of phenazocine, 120 to 1200 parts of ethoheptazine, 40 to 400 parts of propiram, 16 to 160 parts of profadol, 80 to 800 parts of phenampromide, 20 to 200 parts of thiambutene, 16 to 160 parts of pentazocine, 8 to 80 parts of pholcodeine, 30 to 300 parts of codeine, 4 to 40 parts of oxycodone, 5 to 50 parts of dihydrocodeinone, 1.6 to 16 parts of hydromorphone, 0.2 to 2 parts fentanyl, 30 to 300 parts 3-trans-dimethylamino-4-phenyl-4-trans-carbethoxy-Δ'-cyclohexene, 12 to 120 parts of 3-dimethylamino-0-(4-methoxyphenylcarbamoyl)-propiophenone oxime, 10 to 100 parts of (−)β-2'-hydroxy-2,9-dimethyl-5-phenyl-6,7-benzomorphan, 26 to 260 parts of (−)2'-hydroxy-2-(3-methyl-2-butenyl)-9-methyl-5-phenyl-6,7-benzomorphan, 10 to 100 parts of pirinitramide, 10 to 100 parts of (−)α-5,9-diethyl-2'-hydroxy-2-methyl-6,7-benzomorphan, 10 to 100 parts of ethyl 1-(2-dimethylaminoethyl)-4,5,6,7-tetrahydro-3-methyl-4-oxo-6-phenylindole-2-carboxylate, 40 to 400 parts of 1-benzoylmethyl-2,3-dimethyl-3-(m-hydroxyphenyl)-piperidine, 0.2 to 2 parts of N-allyl-7α-(1-(R)-hydroxy-1-methylbutyl)-6,14-endo-ethenotetrahydronororipavine, 28 to 280 parts of (−)2-'-hydroxy-2-methyl-6,7-benzomorphan, 10 to 100 parts of noracylmethadol, 4 to 40 parts of phenoperidine, 5 to 50 parts of α-dl-methadol, 80 to 800 parts of β-dl-methadol, 0.6 to 6 parts of α-1-methadol, 1.6 to 16 parts of β-dl-acetylmethadol, 1.6 to 16 parts of α-1-acetylmethadol or 0.8 to 8 parts of β-1-acetylmethadol, in oral dosage form.

An embodiment of the present invention is an orally effective, analgetic composition which, upon parenteral administration, does not produce analgesia, euphoria or physical dependence, said composition comprising about 0.05 to about 5 mg. of compound I per analgetic oral dose of an orally active, strong analgetic in oral unit dosage form.

A preferred embodiment of the present invention is an orally effective, analgetic composition which, upon parenteral administration, does not produce analgesia, euphoria or physical dependence comprising about 0.05 to about 1.25 mg. of compound I per analgetic oral dose of an orally active, strong analgetic in oral dosage form.

Another preferred embodiment is an orally effective, analgetic composition which upon parenteral administration produces neither analgesia nor euphoria, said composition comprising about 0.05 to about 1.25 mg. of compound I per analgetic oral dose of an analgetic selected from the group comprising meperidine, oxymorphone, alphaprodine, anileridine, dextromoramide, dextroposyphene, methadone, metopon, levorphanol, phenazocine, ethoheptazine, propiram, profadol, phenampromide, thiambutene, pentazocine, pholcodeine, codeine, oxycodone, dihydrocodeinone, hydromorphone, fentanyl, 3-trans-dimethylamino-4-phenyl-4-transcarbethoxy-Δ'-cyclohexene, 3-dimethylamino-0-(4-methoxyphenylcarbamoyl)-propiophenone oxime (−)β-2'-hydroxy-2,9-dimethyl-5-phenyl-6,7-benzomorphan, (−)2'-hydroxy-2-(3-methyl-2-butenyl)-9-methyl-5-phenyl-6,7-benzomorphan, piriinitramide, (−)α-5,9-diethyl-2'-hydroxy-2-methyl-6,7-benzmorphan, ethyl-1-(2-dimethylaminoethyl)-4,5,6,7-tetrahydro-3-methyl-4-oxo-6-phenylindole-2-carboxylate, 1-benzoylmethyl-2,3-dimethyl-3-(m-hyroxyphenyl)-piperidine, N-allyl-7α-(1-(R)-hydroxy-1-methylbutyl)-6,14-endo-ethenotetrahydronororipavine, (−)2'-hydroxy-2-methyl-6,7-benzomorphan, naracylmethadol, phenoperidine, α-dl-methadol, β-dl-methadol, A preferred embodiment of the present invention is the method of producing analgesia in mammals which comprises the oral administration of an orally effective, analgetic composition which, upon parenteral administration, does not produce analgesia, euphoria or physical dependence, said composition comprising an orally ineffective but parenterally effective dose of compound I and an orally active, strong analgetic in oral dosage form.

A preferred embodiment of the present invention is the method of producing analgesia in mammals which comprises the oral administration of an orally effective, analgetic composition which, upon parenteral administration, does not produce analgesia, euphoria or physical dependence, said composition comprising an orally ineffective but parenterally effective dose of compound I and an analgetic dose of an orally active, strong analgetic in oral dosage form.

Another preferred embodiment is the method of producing analgesia in mammals which comprises the oral administration of an orally effective, analgetic composition which, upon parenteral administration, does not produce analgesia, euphoria or physical dependence, said composition comprising compound I and an orally active, strong analgetic in oral dosage form and containing for each analgetic dose of the analgetic agent an amount of compound I sufficient upon parenteral administration of said oral dosage form to negate the analgetic, euphoric and physical dependence producing action of the composition.

A more preferred embodiment is the method of producing analgesia in man which comprises the oral administration of an orally effective, analgetic composition which, upon parenteral adminstration, does not produce analgesia, euphoria or physical dependence, said composition comprising compound I and an analgetic selected from the group consisting of meperidine, oxymorphone, alphaprodine, anileridine, dextromoramide, dextropropoxyphene, methadone, metopon, levorphanol, phenazocine, ethoheptazine, propiram, profadol, phenampromide, thiambutene, pentazocine, pholcodeine, codeine, oxycodone, dihydrocodeinone, hydromorphone, fentanyl, 3-trans-dimethylamino-4-phenyl-4-trans-carbethoxyΔ'-cyclohexene, 3-dimethylamino-0-(4-methoxyphenylcarbamoyl)-propiophenone oxime, (−)β-2'-hydroxy-2,9-dimethyl-5-phenyl-6,7-benzomorphan, (−)2'-hydroxy-2-(3-methyl-2-butenyl)-9-methyl-5-phenyl-6,7-benzomorphan, pirinitramide, (−α-5,9-diethyl-2'-hydroxy-2-methyl-6,7-benzomorphan, ethyl 1-(2-dimethylaminoethyl)-4,5,6,7-tetrahydro-3-methyl-4-oxo-6-phenylindole-2-carboxylate, 1-benzoylmethyl-2,3-dimethyl-3-(m-hydroxyphenyl)-piperidine, N-allyl-7α-(1(R)-hydroxy-1-methylbutyl)-6,14-endo-ethenotetrahydronororipavine, (−)2'-hydroxy-2-methyl-6,7-benzomorphan, noracylmethadol, phenoperidine, α-dl-methadol, β-dl-methadol, α-1-methadol, β-dl-acetylmethadol, α-1-acetylmethadol and β-1-acetylmethadol, in oral dosage form and containing for each analgetic dose of the analgetic agent an amount of compound I sufficient upon parenteral administration of said dosage form to negate the analgetic and euphoric action of the composition.

A still further preferred embodiment is the method of producing analgesia in man which comprises the oral administration of an analgetic dose of an orally effective, analgetic composition which, upon parenteral administration, does not produce analgesia, euphoria or physical dependence, said composition comprising by weight one part of compound I per 80 to 800 parts of meperidine, 0.8 to 8 parts of oxymorphone, 26 to 260 parts of alphaprodine, 24 to 240 parts of anileridine, 4 to 40 parts of dextromoramide, 24 to 240 parts of dextropropoxyphene, 5 to 50 parts of methadone, 0.6 to 6 parts of metopon, 1.6 to 16 parts of levorphanol, 1.6 to 16 parts of phenazocine, 120 to 1,200 parts of ethoheptazine, 40 to 400 parts of propiram, 16 to 160 parts of profadol, 80 to 800 parts of phenampromide, 20 to 200 parts of thiambutene, 16 to 160 parts of pentazocine, 8 to 80 parts of pholcodeine, 30 to 300 parts of codeine, 4 to 40 parts oxycodone, 5 to 50 parts of dihydrocodeinone, 1.6 to 16 parts of hydromorphone, 0.2 to 2 parts fentanyl, 30 to 300 parts 3-trans-dimethylamino-4-phenyl-4trans-carbethoxy-Δ'-cyclohexene, 12 to 120 parts of 3-dimethylamino-0-(4-methoxyphenylcarbamoyl)-propiophenone oxime, 10 to 100 parts of (−)β-2'-hydroxy-2,9-dimethyl-5-phenyl-6,7-benzomorphan, 26 to 260 parts of (−)2'-hydroxy-2-(3-methyl-2-butenyl)-9-methyl-5-phenyl-6,7-benzomorphan, 10 to 100 parts of pirinitramide, 10 to 100 parts of (−)α-5,9-diethyl-2'-hydroxy-2-methyl-6,7-benzomorphan, 10 to 100 parts of ethyl-1-(2-dimethylaminoethyl)-4,5,6,7-tetrahydro-3-methyl-4-oxo-6-phenylindole-2-carboxylate, 40 to 400 parts of 1-benzoylmethyl-2,3-dimethyl-3-(m-hydroxyphenyl)- lpiperidine, 0.2 to 2 parts of N-allyl-7α-(1-(R)-hydroxy-1-methylbutyl)-6,14-endoethenotetrahydronororipavine, 28 to 280 parts of (—)2'-hydroxy-2-methyl-6,7-benzomorphan, 10 to 100 parts of noracylmethadol, 4 to 40 parts of phenoperidine, 5 to 50 parts of α-dl-methadol, 80 to 800 parts of β-dl-methadol, 0.6 to 6 parts of α-1-methadol, 1.6 to 16 parts of β-dl-acetylmethadol, 1.6 to 16 parts of α-1-acetylmethadol or 0.8 to 8 parts of β-1-acetylmethadol, in oral dosage form.

An embodiment is the method of producing analgesia in man which comprises the oral administration of an orally effective, analgetic composition which, upon parenteral administration, does not produce analgesia, euphoria or physical dependence, said composition comprising about 0.05 to about 5 mg. of compound I per analgetic oral dose of an orally active, strong analgetic in oral unit dosage form.

A preferred embodiment is the method of producing analgesia in man which comprises the oral administration of an orally effective analgetic composition which, upon parenteral administration, does not produce analgesia, euphoria or physical dependence, said composition comprising about 0.05 to about 1.25 mg. of compound I per analgetic oral dose of an orally active, strong analgetic in oral unit dosage form.

A most preferred embodiment is the method of producing analgesia in man which comprises the oral administration of an orally effective, analgetic composition which, upon parenteral administration, does not produce analgesia, euphoria or physical dependence, said composition comprising about 0.05 to about 1.25 mg. of compound I per analgetic oral dose of an analgetic selected from the group comprising meperidine, oxymorphone, alphaprodine, anileridine, dextromoramide, dextropropoxyphene, methadone, metopon, levorphanol, phenazocine, ethoheptazine, propiram, profadol, phenampromide, thiambutene, pentazocine, pholcodeine, codeine, oxycodone, dihydrocodeinone, hydromorphone, fentanyl, 3-trans-dimethylamino-4-phenyl-4-trans-carbethoxy-Δ'-cyclohexene, 3-dimethylamino-0-(4-methoxyphenylcarbamoyl)-propiophenone oxime, (—)β-2'-hydroxy-2,9-dimethyl-5-phenyl-6,7-benzomorphan, (—)2'-hydroxy-2-(3-methyl-2-butenyl)-9-methyl-5-phenyl-6,7-benzomorphan, (—)2'-hydroxy-2-(3-methyl-2-butenyl)-9-methyl-5-phenyl-6,7-benzomorphan, pirinitramide, (—)α-5,9-diethyl-2'-hydroxy-2-methyl-6,7-benzomorphan, ethyl 1-(2-dimethylaminoethyl)-4,5,6,7-tetrahydro-3-methyl-4-oxo-6-phenylindole-2-carboxylate, 1-benzoylmethyl-2,3-dimethyl-3-(m-hydroxyphenyl)-piperidine, N-allyl-7α-(1-(R)-hydroxy-1-methylbutyl)-6,14-endo-ethenotetrahydronororipavine, (—) 2'-hydroxy-2-methyl-6,7-benzomorphan, noracylmethadol, phenoperidine, α-dl-methadol, β-dl-methadol, α-1-methadol, β-dl-acetylmethadol, α-1-acetylmethadol and β-1-acetylmethadol, in unit oral dosage form.

The weight ratios of compound I to the analgetic agents in the composition of the instant invention have been determined from the literature. The parenteral administration of one part by weight of compound I will efficiently and reliably negate (counteract) the parenteral effect of up to about 800 parts of meperidine, 8 parts of oxymorphone, 260 parts of alphaprodine, 240 parts of anileridine, 40 parts of dextromoramide, 240 parts of dextropropoxyphene, 50 parts of methadone, 6 parts of metopon, 16 parts of levorphanol, 16 parts of phenazocine, 1,200 parts of ethoheptazine, 400 parts of propiram, 160 parts of profadol, 800 parts of phenampromide, 200 parts of thiambutene, 160 parts of pentazocine, 80 parts of pholcodeine, 300 parts of codeine, 40 parts of oxycodone, 50 parts of dihydrocodeinone, 16 parts of hydromorphone, 2 parts of fentanyl, 300 parts of 3-trans-dimethylamino-4-phenyl-4-trans-carbethoxy-Δ'-cyclohexene, 120 parts of 3-dimethylamino-0-(4-methoxyphenylcarbamoyl)-propiophenone oxime, 100 parts of (—)β-2'-hydroxy-2,9-dimethyl-5-phenyl-6,7-benzomorphan, 260 parts of (—)2'-hydroxy-2-(3-methyl-2-butenyl)-9-methyl-5-phenyl-6,7-benzomorphan, 100 parts of pirinitramide, 100 parts of (—)α-5,9-diethyl-2'-hydroxy-2-methyl-6,7-benzomorphan, 100 parts of ethyl 1-(2-dimethylaminoethyl)-4,5,6,7-tetrahydro-3-methyl-4-oxo-6-phenylindole-2-carboxylate, 400 parts of 1-benzoylmethyl-2,3-dimethyl-3-(m-hydroxyphenyl)-piperidine, 2 parts N-allyl-7α-(1-(R)-hydroxy-1-methylbutyl)-6,14-endo-ethenotetrahydronororipavine, 280 parts of (—)2'-hydroxy-2-methyl-6,7-benzomorphan, 100 parts of noracylmethadol, 40 parts of phenoperidine, 50 parts of α-dl-methadol, 800 parts of β-dl-methadol, 6 parts of α-1-methadol, 16 parts of β-dl-acetylmethadol, 16 parts of α-1-acetylmethadol or 8 parts of β-1-acetylmethadol.

Compound I can be administered orally in a quantity up to about ten times the minimal parenteral dose required to abolish parenteral activity of the analgetic without abolishing the oral activity or the analgetic, e.g., 1 part compound I per 80 parts meperidine, 1 part compound I per 1.6 parts phenazocine, etc.

It is emphasized here that it is frequently possible to orally administer more than 10 times the minimum parenteral dose of compound I without diminishing the oral analgetic effect.

Applicants acknowledge the possiblity of different compound I/analgetic ratios due to species differences, e.g., rat versus man, etc., however the ratios given herein are for man.

DESCRIPTION OF THE PREFERRED EMBODIMENTS

| Example 1 | |
|---|---|
| Compound I | 0.05 gram |
| Methadone Hydrochloride | 0.500 gram |
| Lactose qs. ad. | 100 capsules |

| Example 2 | |
|---|---|
| Compound I | 0.5 gram |
| Phenazocine Hydrobromide | 2.5 grams |
| Magnesium Stearate qs. | |
| Corn Starch qs. ad. | 1000 tablets |

| Example 3 | |
|---|---|
| Compound I | 0.025 gram |
| Meperidine Hydrochloride | 5.0 grams |
| Corn Starch | |
| Talc āā qs. ad. | 100 capsules |

| Example 4 | |
|---|---|
| Compound I | 0.25 gram |
| Methadone Hydrochloride | 5.0 gram |
| Lactose qs. ad. | 100 capsules |

| Example 5 | |
|---|---|
| Compound I | 0.2 gram |
| Codeine Sulfate | 30 grams |
| Magnesium Stearate qs. | |

-Continued

| | |
|---|---|
| Corn Starch qs. ad. | 1000 tablets |
| Example 6 | |
| Compound I | 0.5 gram |
| Dextropropoxyphene Hydrochloride | 65.0 grams |
| Lactose, qs. ad. | 1000 capsules |
| Example 7 | |
| Compound I | 0.025 gram |
| Camphorated Opium Tincture, U.S.P., qs. ad. | 100 ml. |

We claim:

1. A method for the treatment of drug addicted subjects which comprises oral administration to such subject of an effective amount of a composition consisting essentially of (a) methadone in an amount sufficient to substantially prevent narcotic craving and (b) 1-N-cyclopropylmethyl-7,8-dihydro-14-hydroxynormorphinone in an amount sufficient to induce withdrawal symptoms when said composition is administered parenterally, but insufficient to negate the action of said methadone when the composition is administered orally.

2. The method of claim 1, wherein the weight ratio of methadone to 1-N-cyclopropylmethyl-7,8-dihydro-14-hydroxynormorphinone is from about 5:1 to about 50:1.

* * * * *